July 31, 1962    D. C. GRAHAM    3,046,852
GRATINGS

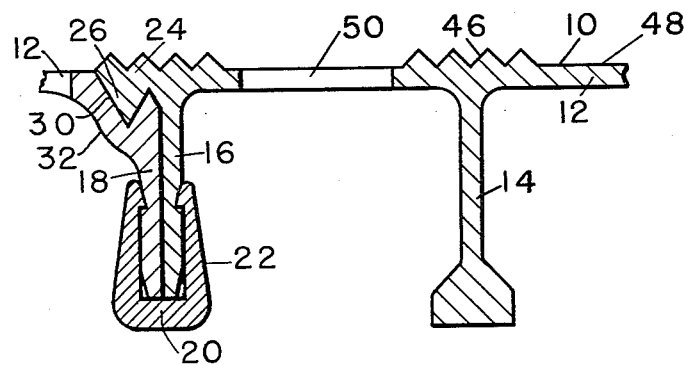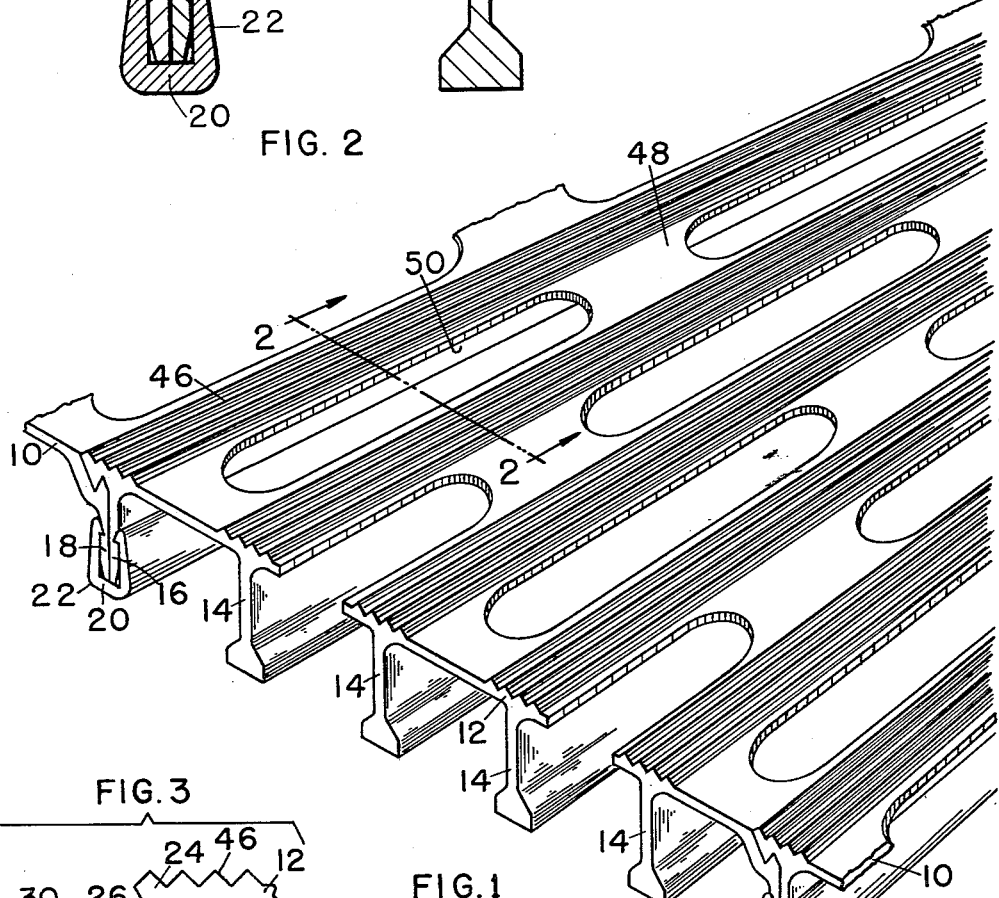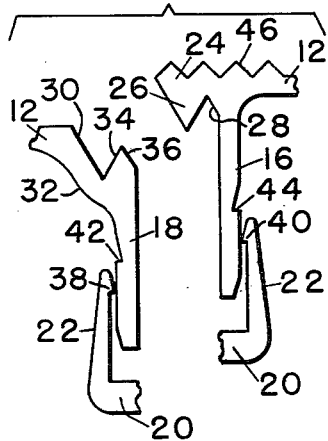

Filed July 3, 1958    2 Sheets-Sheet 2

INVENTOR.
DONALD C. GRAHAM
BY
*Otto Moeller*

United States Patent Office 3,046,852
Patented July 31, 1962

3,046,852
GRATINGS
Donald Conway Graham, Dover, Pa., assignor to Capitol Products Corporation, Mechanicsburg, Pa., a corporation of Pennsylvania
Filed July 3, 1958, Ser. No. 746,392
3 Claims. (Cl. 94—30)

This invention relates to new and useful improvements in composite metal gratings for floors, cat-walks, decks, runways and the like and more particularly to gratings, the elements of which are all formed of metal extrusions.

Such gratings comprise a floor providing a tread surface and longitudinally extending depending flanges forming load bearer bars adapted to rest upon a floor or spaced supporting members. As a matter of manufacturing expediency and to facilitate handling, the gratings are formed of a plurality of extruded grate sections which can be of any desired practical length but are of limited width, a number of such sections being connected in side by side relation.

An object of the invention resides in the provision of a novel composite grating structure of the type aforesaid, formed of like grate sections of extruded metal which are readily assembled to form a unitary rigid flooring.

Another object is to provide a novel composite grating structure wherein the grate sections may be assembled into a rigid structure without the use of bolts, rivets or welding and are readily and conveniently assembled in the field without the use of special tools.

Another object is to provide a novel composite grating structure formed of like grate sections of extruded metal having novel interlocking means for securing the grate sections together to form a continuous tread surface and having integral load bearing flanges adapted to rest on a supporting structure for the grating.

A further object is to provide novel grating sections of like extruded metal form, that are simple in design and construction, inexpensive to manufacture and are adapted for side by side interengagement to form a composite grating structure. A related object is to provide grate sections of like extruded metal form having novel interengaging means facilitating assembly of a plurality of grate sections into a composite grating structure.

Further objects and advantages of the invention will become apparent from the following description and the accompanying drawings, in which—

FIGURE 1 is a fragmentary perspective view of a plurality of assembled grate sections constructed in accordance with the present invention;

FIGURE 2 is a sectional view on line 2—2 of FIGURE 1 through adjacent sides of two adjoining grate sections;

FIGURE 3 is an exploded view in end elevation of adjacent portions of two adjoining grate sections and the clip means;

Figure 6:
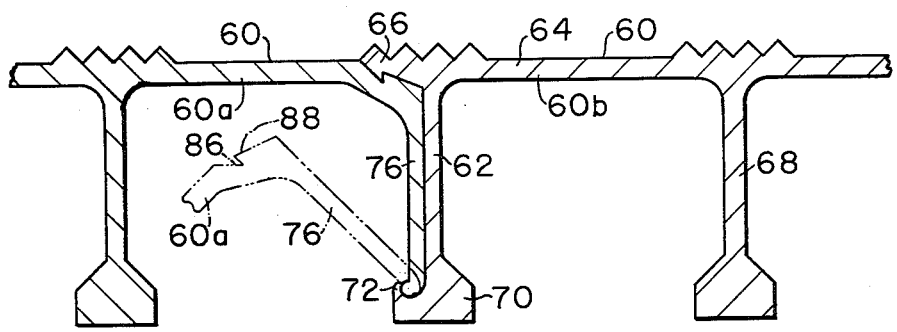
FIGURE 6 is an enlarged sectional view through the adjacent portions of two of the adjoining grate sections of FIGURE 5.

Referring particularly to FIGURES 1 to 4, the novel grating is formed of any desired number of identical grate sections 10 connected in side by side relation, the grate sections 10 being preferably formed of aluminum extruded through a suitable die to produce the shape illustrated.

Since the grate sections 10 are identical, it will be understood that the description of a single grate section 10 applies equally to all the grate sections which when assembled form a composite grating.

The grate section 10 comprises a platform or floor 12 from which depend a series of intermediate equidistantly spaced longitudinally extending parallel flanges 14 forming bearer bars. The lower edges of the flanges 14 lie in a common plane and are adapted to rest on a floor or other suitable structure for supporting the grate section 10. The opposite sides of the grate section 10 have formed therewith depending longitudinally extending flanges 16 and 18 parallel with respect to and spaced from their neighboring bearer bar flanges 14 the same distance as the spacing between the bearer bar flanges 14. The lower edges of the flanges 16 and 18 terminate short of the lower edges of the bearer bar flanges 14 by a distance equal to the thickness of the bight portion 20 of clip means 22, so that when the clip means 22 is assembled with the abutting flanges 16 and 18 of a pair of adjoining grate sections 10, as later described in detail, the assembly of the clip means 22 with the abutting flanges 16 and 18 in effect also form bearer means adapted to rest on the floor or other suitable structure for supporting the grating.

On the flange 16 side of the grate section 10, its floor 12 projects laterally beyond the flange 16 to form an overhang 24. The outer end portion of the overhang 24 has formed on its under surface a longitudinally extending preferably V-shaped rib 26 projecting downwardly below the plane of the under surface of the floor 12 to form with the upper side portion of the flanges 16 a reentrant longitudinally extending groove 28.

On the flange 18 side of the grate section 10, the floor 12 above and adjacent the flange 18 is depressed as at 30, the extruding die being formed to deform the floor 12 to provide a sloping shoulder 32 joining the uper portion of the flange 18 with the un-depressed portion of the floor 12. In the shoulder 32 of the floor 12 is formed a longitudinally extending preferably V-shaped groove 34 opening upwardly into the depression 30. The width of the overhang 24 is equal to the width of the depression 30, so that when assembling a pair of grate sections 10 the overhang 24 at one end of a grate section 10 is received in the depression 30 of the adjoining grate section, with the depending rib 26 of the overhang 24 being received in the groove 34 of the shoulder 32. Also the upper end 36 of the flange 18 of one grate section 10 which defines one side of the V-shaped groove 34 is received in the reentrant groove 28 of the overhang 24 of an adjoining grate section 10. The grate sections 10 are thus interlocked against relative lateral displacement by engagement of the ribs 26 in the grooves 34 and the upper ends 36 of the flanges 18 in the grooves 28.

Relative vertical displacement of the adjoining ends of a pair of grate sections 10 is prevented by means of the clips 22, previously referred to. The clips 22, which are also formed of metal extrusions, are generally U-shaped in cross section and the upper edges of the sides thereof are formed with longitudinally extending lips 38 and 40 projecting inwardly toward each other and are arranged to engage longitudinally extending notches 42 and 44 formed in the opposed sides of a pair of abutting flanges 18 and 16. The sides of the clips 22 are sufficiently yieldable to permit them to be forced apart when the clips are forced over the lower ends of a pair of abutting flanges 18 and 16. While the clips 22 preferably extend the full length of the flanges 18 and 16, it is apparent that they may be made in shorter lengths spaced along the flanges 18 and 16.

The tread surface of the grate section floor 12 is preferably formed with a plurality of groups of upstanding inverted V-shaped longitudinally extending ribs 46 overlying the bearer bar flanges 14 and the flange 16, leaving a plane flat tread surface 48 between each group of ribs 46. After extrusion of the grate sections 10, openings 50 of any desired size and shape are stamped out of the tread surfaces 48 to provide for passage of light and air, and water drainage therethrough.

It is apparent that the grating described above can be readily and conveniently assembled in the field without any special tools. The grating may also be cut to fit around obstructions without any parts thereof becoming loose or disassembled.

Figure 5:
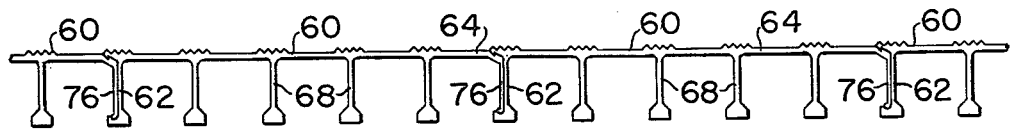
FIGURE 5 is an end elevation of a plurality of assembled grate sections of modified construction.
Figure 4:
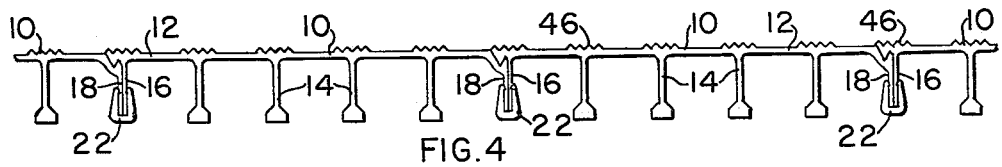
FIGURE 4 is an end elevation of a plurality of assembled grate sections.
Figure 7:
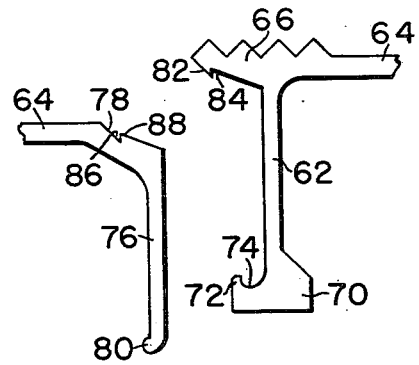
FIGURE 7 is an exploded view in end elevation of adjacent portions of two of the adjoining grate sections of FIGURE 5.

In FIGURES 5, 6 and 7 there is shown a modified form of the invention, which is generally the same in construction as the form of the invention previously described except for the construction of the end flanges of the grate sections 60, which permits the grate sections to be interlocked to form a rigid composite grating, without the use of the clips 22.

In this form of the invention the end flange 62 depending from the underside of the floor 64 of a grate section 60 on that side thereof having the overhanging floor portion 66, has its lower edge terminating in the same plane as the plane of the lower edges of the intermediate bearer bar flanges 68. The flange 62 is provided on its widened base portion 70 on that side below the overhang 66 with an upturned lip 72 extending longitudinally the length of the flange 62 and forming with the web of the flange 62 an upwardly opening groove 74.

As in the first form of the invention, the flange 76 on the side of the grate section 60 having the depression 78 terminates short of the plane of the bearer bar flanges 68, but is formed at its lower edge with a longitudinally extending bead 80 adapted to be received in the groove 74 of the flange 62 of an adjoining grate section 60. Also as in the form of the invention first described, the overhang 66 and the depressed floor portion of the grate sections are provided with complementary interengaging ribs and grooves. Depending from the underside of the outer end portion of the overhang 66 is an inverted V-shaped longitudinally extending rib 82 directed toward the flange 62 to form between it and the flange 62, a longitudinally extending groove 84.

The portion of the floor 64 defining the depression 78 at the flange 76 side of the grate section 60 is formed with a V-shaped groove 86 and a rib 88 which are complementary to the rib 82 and groove 84 of the overhang 66, so that when assembling a pair of grate sections 60, the rib 82 and groove 84 of the overhang of one grate section engage the groove 86 and rib 88 of an adjoining grate section.

In assembling a pair of grate sections the bead 80 of the flange 76 of one grate section is inserted in the groove 74 of the flange 62 of another grate section, after which, referring to FIGURE 6, the grate section 60a is moved pivotally upward from the position shown in phantom with the groove 74 serving as a fulcrum, whereupon the upper surface of rib 88 will engage the outer side of the rib 82. Upon further upward pivotal movement of grate section 60a, the overhang 66 will be forcibly sprung slightly upward until the rib 88 engages groove 84 and rib 82 engages groove 86, whereupon the overhang 66 will snap downwardly to provide locking engagement of the ribs and grooves. The two grate sections are thus rigidly locked together against relative vertical and lateral displacement. The inherent resiliency of the metal permits the overhang 66 to snap back into its original position after having been sprung upwardly on forcible engagement of the ribs 82 and 88.

I claim:

1. A grating including a plurality of interengaged grate sections; each grate section having a floor providing an upper tread surface and having a plurality of longitudinally extending laterally spaced parallel flanges depending from the under side thereof; said floor on one longitudinal side of each grate section extending laterally beyond the terminal flange on that side of the grate section to form an overhang, the floor on the opposite longitudinal side of each grate section terminating flush with the terminal flange on that side of the grate section and having its end portion depressed below the tread surface of the floor to receive the overhang of an adjoining grate section and to bring the terminal flanges of adjoining grate sections in abutting relation, the nether surface of said overhang and the top surface of said depressed floor portion each having complementary interengaging longitudinally extending ribs and grooves securing adjoining grate sections against relative lateral displacement, the lower portion of the opposed sides of said abutting terminal flanges being provided with longitudinally extending notches; and resilient clip means U-shaped in cross section having inwardly extending lips projecting from the upper sides thereof arranged to snap into engagement with said notches upon forcing of said clip means in a direction normal to the plane of said floor over the lower ends of said abutting flanges to yieldably spread the sides of said clip means by engagement of said inwardly extending lips with the sides of the lower ends of said abutting flanges.

2. A grating structure as defined in claim 1 wherein the flanges between said terminal flanges have their lower ends disposed in a common plane and are adapted to rest on a supporting structure to provide load bearing supports, and wherein said terminal flanges terminate at their lower edges short of said common plane by the thickness of the bight portion of said clips, whereby said terminal flanges and clips provide additional load bearing supports.

3. A grating including a plurality of adjoining elongated longitudinally extending grate sections of extruded metal, each grate section having a floor providing an upper tread surface, said floor along one longitudinal side thereof being depressed below the level of said tread surface, a longitudinally extending flange depending from the outer edge of the depressed portion of said floor, a longitudinally extending flange depending from said floor and offset inwardly of the opposite longitudinal side edge of said floor a distance to form an overhanging floor portion providing a lateral depth of engagement thereof in the depressed floor portion of an adjoining grate section to bring the adjacent flanges of adjoining grate sections in abutting relation, said overhanging and depressed floor portions each having on their respective nether and top surfaces interengaging longitudinally extending ribs and grooves securing adjoining grate sections against relative lateral displacement, the opposed sides of said adjacent flanges being provided with longitudinally extending notches, and resilient clip means U-shaped in cross section having inwardly extending lips projecting from the upper sides thereof, the distance between the adjacent ends of said lips being slightly less than the combined thickness of said adjacent flanges, whereby said lips are resiliently engageable in said notches upon forcing of said clip means over said adjacent flanges for rigidly securing adjoining grate sections in assembled relation.

References Cited in the file of this patent

UNITED STATES PATENTS

| 1,706,924 | Kane | Mar. 26, 1929 |
| 1,913,342 | Schaffert | June 6, 1933 |
| 2,742,121 | Liskey | Apr. 17, 1956 |

FOREIGN PATENTS

| 371,359 | France | Jan. 21, 1907 |
| 178,591 | Great Britain | 1922 |
| 643,921 | Great Britain | Sept. 27, 1950 |
| 294,607 | Switzerland | Feb. 1, 1954 |
| 719,751 | Great Britain | Dec. 8, 1954 |